April 21, 1936.  D. G. DUTY ET AL  2,037,969
SAFETY SIGNAL DEVICE FOR TIRES
Filed Nov. 10, 1934
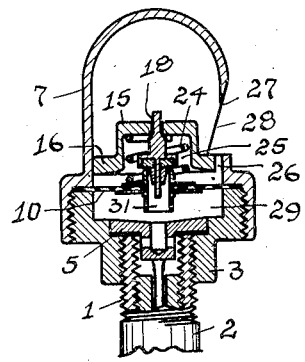
FIG. 1
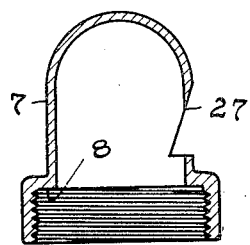
FIG. 2
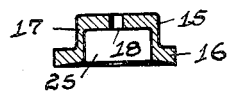
FIG. 3
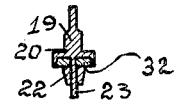
FIG. 4
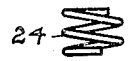
FIG. 5
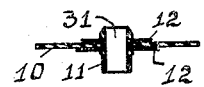
FIG. 6
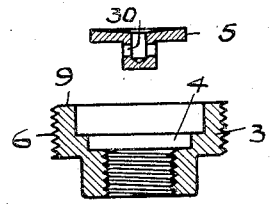
FIG. 7
FIG. 8
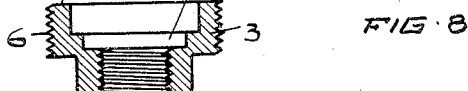
Inventors
Dorsey G. Duty
and
Lawrence D. Rogers
By Percy Harwood
attorney Patented Apr. 21, 1936

2,037,969

UNITED STATES PATENT OFFICE 2,037,969

SAFETY SIGNAL DEVICE FOR TIRES

Dorsey G. Duty and Lawrence D. Rogers, Akron, Ohio

Application November 10, 1934, Serial No. 752,518

2 Claims. (Cl. 116—34)

Our invention relates to air pressure indicating means for automobile tires of the type described in our copending application, Serial No. 726,562, filed May 19, 1934.

The main object of the present invention is to provide a simplified form of pressure indicating means for automobile tires particularly constructed to permit the same to be easily and firmly attached to the valve stem of a tire valve, and to be readily assembled and disassembled, thus facilitating exchange or repair of the valve parts.

Another object of the invention is to provide a pressure indicating means with a single diaphragm and valve seat member, which member forms an independent part of the indicating means and is adapted to be readily removed and replaced within said pressure indicating means.

This and other objects and advantages of the invention will be apparent from the following specification considered with the accompanying drawing, in which:

Figure 1 is a transverse section through the device applied to a tire valve stem;

Figure 2 is a transverse section through the dust cap;

Figure 3 is a transverse section through the valve supporting member;

Figure 4 is a transverse section through the valve member;

Figure 5 is a side view of the valve spring;

Figure 6 is a transverse section through the diaphragm carrying the tubular valve seat member;

Figure 7 is a transverse section through the operating member for shifting the valve stem of a tire valve; and Figure 8 is a transverse section through the coupling member securing the structure to a tire valve stem.

Referring now to the embodiment of the invention illustrated in the drawing 1 denotes the threaded upper portion of a hollow valve stem 2 of a pneumatic automobile tire, not shown. Secured to the stem 2 is a threaded coupling 3, which carries, rigid wedged into a recess 4, a passaged tire valve stem actuating member 5. Coupling 3 is outwardly threaded as at 6 for threaded connection with a dust cap 7. This cap is inwardly offset to form a shoulder 8, co-operating with the inner end 9 of the member 3 in seating and sealing the peripheral edge of a flexible diaphragm 10, which centrally supports a short tubular movable valve seat member 11. Preferably as shown the central area of the diaphragm 10 is stiffened by means of disks 12 which serve to clamp the member 11 to the diaphragm.

The valve seat member 11 co-operates with a valve member 20 carried by a cup-shaped member 15, the circular flange 16 of which is pressed into the dust cap 7. A recessed portion 17, of this member 15, is apertured as at 18, whereby an upwardly extending post 19 integrally formed on the valve member 20 is tightly fitted therein, which member is preferably recessed at its lower face to snugly seat a soft metal inset 32, held in place by means of a collar 22, seated upon a downwardly extending arm 23. A spring 24 seated within the recessed portion of cup-shaped member 15 and bearing against the diaphragm 10 yieldingly holds the movable valve seat member 11 out of engagement with the valve member 20.

The interior of the member 15 constitutes an air chamber 25 from which air escapes through passage 26, and is directed against a beveled portion 27 of the dust cap 7, with sharply audible whistling effect, when the pressure in the tire drops below a predetermined minimum. The passage 26 is formed by cutting away a portion of the circular flange 16 of member 15 and the beveled area or portion 27 is formed by cutting away a section of the dust cap as at 28.

The operation of the device is as follows:

Assuming the spring 24 bearing upon the diaphragm 10 is of such strength as to overcome a pressure of about ten pounds, exerted thereagainst by the diaphragm, and that the pressure in the tire is above ten pounds, then the valve will remain closed, or in Figure 1 position. This action is due to the fact that the pressure of the air entering chamber 29 through a passage 30 in member 5 from the tire, is normally above ten pounds per square inch and consequently the flexible diaphragm 10 will be forced upwardly, so that the tubular valve seat member 11 seats against valve member 20 thus closing a passage 31 through said valve seat member. If however the pressure in the tire and therewith the pressure in the chamber 29 drops below ten pounds pressure, due to valve leakage, punctures, etc., the spring 24 will force the diaphragm 10 downwardly thus permitting the air to escape from chamber 29 through the passage 31 in the member into the chamber above the diaphragm and thence through passage 26 into the open atmosphere. A warning signal is thus given before the tire becomes damaged, by the action of the escaping air impinging against the sharp edge 27, directly in line with the restricted outer outlet end of passage 26.

Having thus described our invention, what we claim is:

1. An air pressure indicating means adapted to be screwed to the threaded end of a valve stem of a pneumatic automobile tire comprising a threaded coupling member having its upper end recessed to provide a chamber, a dust cap secured to said coupling member, a yieldable diaphragm clamped between said coupling member and said dust cap, a tubular valve seat member secured to and yieldingly carried by said diaphragm, a cup-shaped member pressed into said dust cap, a check valve carried by said member and co-operating with said tubular seat member, a spring having its upper end seated and centered in said cup-shaped member and its lower end seated against said diaphragm and means for audibly indicating the escape of air from said tire when said valve seat is unseated from said check valve.

2. An air pressure indicating means adapted to be screwed to the threaded end of a valve stem of a pneumatic automobile tire comprising a threaded coupling member having its upper end recessed to provide a chamber, a dust cap having a beveled cut-away portion and secured to said coupling member, a yieldable diaphragm clamped between said coupling member and said dust cap, a tubular valve seat member secured to and yieldingly carried by said diaphragm, a cup-shaped member having a flange pressed into the dust cap, a check valve carried by said guide member and co-operating with said tubular seat member, the flange of said cup-shaped member being partly cut away to form a restricted outlet adapted to emit a thin stream of air against said beveled cut away portion to produce a whistling sound, when air under pressure escapes from said pressure indicating means through the movable valve seat member and said air passage.

DORSEY G. DUTY.
LAWRENCE D. ROGERS.